(12) United States Patent
Herman et al.

(10) Patent No.: US 10,981,564 B2
(45) Date of Patent: Apr. 20, 2021

(54) VEHICLE PATH PLANNING

(71) Applicant: Ford Global Technologies, LLC, Dearborn, MI (US)

(72) Inventors: David Michael Herman, Southfield, MI (US); Stephen Jay Orris, Jr., New Boston, MI (US); David Joseph Orris, Southgate, MI (US); Nicholas Alexander Scheufler, Flat Rock, MI (US); Nunzio DeCia, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 36 days.

(21) Appl. No.: 16/104,177

(22) Filed: Aug. 17, 2018

(65) Prior Publication Data

US 2020/0055515 A1 Feb. 20, 2020

(51) Int. Cl.
*B60W 30/09* (2012.01)
*G05D 1/02* (2020.01)
(Continued)

(52) U.S. Cl.
CPC ........ *B60W 30/09* (2013.01); *B60W 30/0956* (2013.01); *G05D 1/0088* (2013.01); *G05D 1/0246* (2013.01); *G06K 9/00805* (2013.01); *G06N 3/08* (2013.01); *G06N 5/046* (2013.01); *H04W 4/44* (2018.02); *H04W 4/46* (2018.02); *B60W 2420/42* (2013.01); *G05D 2201/0213* (2013.01)

(58) Field of Classification Search
CPC .... G05D 1/0088; G05D 1/021; G05D 1/0278; G05D 1/0246; G01C 21/005; G06K 9/00791; G06K 9/00805; G06K 9/00825; B62D 15/025; B62D 15/0265; B62D 15/0255; G08G 1/16; B60W 30/0956
USPC ............... 701/301, 411; 340/903; 342/455
See application file for complete search history.

(56) References Cited

U.S. PATENT DOCUMENTS 6,879,969 B2  4/2005  Engstrom et al.
8,195,341 B2  6/2012  Huang et al.
(Continued)

FOREIGN PATENT DOCUMENTS

KR    1020140033277 A    3/2014
WO    2017057528 A1    4/2017

OTHER PUBLICATIONS

Neural Network Predicting Remote Vehicle Movement with Vehicle-to-Vehicle Data;;Alexander Breg ; Yi Lu Murphey ; Takchoi Yu; 2018 IEEE Symposium Series on Computational Intelligence (SSCI); IEEE Conference Paper; (Year: 2018).*
(Continued)

*Primary Examiner* — Cuong H Nguyen
(74) *Attorney, Agent, or Firm* — Frank A. MacKenzie; Bejin Bieneman PLC

(57) ABSTRACT

A computing system can be programmed to determine a location, speed and direction for a first vehicle. The computer can be further programmed to determine probabilities for predicted locations, speeds and directions of the first vehicle based on identifying the first vehicle and the driving environment. The computer can be further programmed to operate a second vehicle based on the determined probabilities for predicted locations, speeds and directions of the first vehicle.

20 Claims, 7 Drawing Sheets

(51) Int. Cl.

| | |
|---|---|
| B60W 30/095 | (2012.01) |
| G06K 9/00 | (2006.01) |
| G06N 3/08 | (2006.01) |
| G06N 5/04 | (2006.01) |
| H04W 4/44 | (2018.01) |
| H04W 4/46 | (2018.01) |
| G05D 1/00 | (2006.01) |

(56) References Cited

U.S. PATENT DOCUMENTS

| | | |
|---|---|---|
| 8,260,515 B2 | 9/2012 | Huang et al. |
| 8,280,601 B2 | 10/2012 | Huang et al. |
| 8,660,734 B2 | 2/2014 | Zhu et al. |
| 8,965,621 B1 | 2/2015 | Urmson et al. |
| 9,120,484 B1 | 9/2015 | Ferguson et al. |
| 9,248,834 B1 | 2/2016 | Ferguson et al. |
| 9,465,105 B2 | 10/2016 | Park |
| 9,495,874 B1 | 11/2016 | Zhu et al. |
| 9,511,767 B1 | 12/2016 | Okumura et al. |
| 9,569,962 B2 | 2/2017 | Schuller |
| 9,576,083 B2 | 2/2017 | Kozloski et al. |
| 9,630,625 B2 | 4/2017 | Shin et al. |
| 9,669,827 B1 | 6/2017 | Ferguson et al. |
| 9,731,713 B2 | 8/2017 | Horii |
| 9,766,626 B1* | 9/2017 | Zhu ................... G01S 13/862 |
| 9,784,592 B2 | 10/2017 | Gupta et al. |
| 10,754,029 B2* | 8/2020 | Talamonti ............. G02B 27/01 |
| 2008/0140318 A1* | 6/2008 | Breed .................. G05D 1/0246 702/3 |
| 2010/0082195 A1* | 4/2010 | Lee ..................... G01C 21/12 701/25 |
| 2015/0166069 A1 | 6/2015 | Engelman et al. |
| 2016/0101785 A1 | 4/2016 | Takahashi et al. |
| 2017/0329332 A1 | 11/2017 | Pilarski et al. |
| 2017/0336794 A1* | 11/2017 | Shashua ............... G01C 21/32 |
| 2018/0053108 A1* | 2/2018 | Olabiyi ................ B60W 40/09 |
| 2018/0061237 A1 | 3/2018 | Erickson et al. |
| 2018/0217600 A1* | 8/2018 | Shashua ............... G05D 1/0251 |
| 2018/0261095 A1* | 9/2018 | Qiu ...................... G08G 1/164 |
| 2018/0281804 A1* | 10/2018 | Talamonti ............. G08G 1/205 |
| 2018/0281854 A1* | 10/2018 | Talamonti ............. G01S 13/931 |
| 2018/0281856 A1* | 10/2018 | Talamonti .......... B62D 15/0255 |
| 2018/0284266 A1* | 10/2018 | Talamonti ............ G05D 1/0214 |
| 2018/0284770 A1* | 10/2018 | VandenBerg, III .... G06N 20/00 |
| 2019/0118810 A1* | 4/2019 | Paris ...................... B60Q 5/006 |
| 2019/0176818 A1* | 6/2019 | Movert .................... G06N 3/04 |
| 2019/0179328 A1* | 6/2019 | Movert ................... G06F 16/29 |
| 2020/0055515 A1* | 2/2020 | Herman ................. H04W 4/46 |
| 2020/0073405 A1* | 3/2020 | Xu ................... G08G 1/096811 |
| 2020/0082817 A1* | 3/2020 | Narayanan ........... G06N 3/0454 |
| 2020/0184233 A1* | 6/2020 | Berberian .......... G06K 9/00798 |
| 2020/0326707 A1* | 10/2020 | Shashua ............... B62D 15/025 |

OTHER PUBLICATIONS

Predicting Car Collisions Using RSSI; Billy Kihei ; John A. Copeland ; Yusun Chang; 2015 IEEE Global Communications Conference (GLOBECOM); IEEE Conference Paper, (Year: 2015).*
Trajectory Estimations Using Smartphones; Cesar Barrios ; Yuichi Motai ; Dryver Huston; IEEE Transactions on Industrial Electronics; vol. 62, Issue: 12, IEEE Journal Article, (Year: 2015).*
Vehicular Path Prediction for Cooperative Driving Applications through Digital Map and Dynamic Vehicle Model Fusion; Derek Caveney; 2009 IEEE 70th Vehicular Technology Conference Fall; IEEE Conference Paper; (Year: 2009).*
Path planning for autonomous underwater vehicle docking in stationary obstacle environment; Chenzhan Liu;Shuangshuang Fan; Bo Li;Shumin Chen;Yuanxin Xu;Wen Xu; OCEANS 2016—Shanghai; IEEE Conference Paper. (Year: 2016).*
Vision for vehicle guidance using two road cues; G. Funka-Lea;R. Bajcsy; Proceedings of the Intelligent Vehicles '92 Symposium Year: 1992; IEEE Conference Paper (Year: 1992).*
Hierarchical Software Architectures and Vehicular Path Prediction for Cooperative Driving Applications; Derek Caveney; 2008 11th International IEEE Conference on Intelligent Transportation Systems; IEEE Conference Paper (Year: 2008).*
Barth et al., Tracking oncoming and turning vehicles at intersections, IEEE Conference on Intelligent Transportation Systems, Oct. 2010.
Chen et al., "StyleBank: An Explicit Representation for Neural Image Style Transfer", IEEE Xplore, Mar. 2017.
Cherng et al., "Critical Motion Dete4ction of Nearby Moving Vehicles in a Vision-Based Driver-Assistance System", IEEE Transactions on Intelligent Transportation Systems, vol. 10, No. 1, Mar. 2009.
Chung et al., "A Recurrent Latent Variable Model for Sequential Data", Cornell University, Apr. 6, 2016, arXiv:1506.02216v6.
Diaz Alonso et al., "Lane-Change Decision Aid System Based on Motion-Driven Vehicle Tracking", IEEE Transactions on Vehicular Technology, vol. 57, No. 5, Sep. 2008.
Dong et al., "Autoencoder Regularized Network for Driving Style Representation Learning", Proceedings of the Twenty-Sixth International Joint Conference on Artificial Intelligence (IJCAI-2017).
Dong et al., Characterizing Driving Styles with Deep Learning, Oct. 8, 2016, https://arxiv.org/pdf/1607.03611.pdf.
Doshi et al., "On the Roles of Eye Gaze and Head Dynamics in Predicting Driver's Intent to Change Lanes", IEE Transactions on Intelligent Transportation Systems, vol. 10, No. 3, Sep. 2009.
Fridman, "MIT Self-Driving Cars: Emilio Frazzoli, CTO, nuTonomy", May 29, 2018, https://www.youtube.com/watch?v=dWSbltdOHEA&feature=youtu.be.
Geiger et al., "ObjectFlow: A Descriptor for Classifying Traffic Motion", IEEE Xplore Conference Intelligent Vehicles Symposium (IV), 2010 IEEE.
Hermes et al., "Vehicle Tracking and Motion Prediction in Complex Urban Scenarios", IEEE Xplore, Conference Paper, Jul. 2010.
AM 207—Priors, https://am207.github.io/2017/wiki/priors.html, May 29, 2018.
Kasper et al., "Object-Oriented Bayesian Networks for Detection of Lane Change Maneuvers", 2011 IEEE Intelligent Vehicles Symposium, Jun. 2011.
Khaksar et al., "Application of Sampling-Based Motion Planning Algorithms in Autonomous Vehicle Navigation", Sep. 7, 2016, DOI:10.5772/64730, https://www.intechopen.com/books/autonomous-vehicle/application-of-sampling-based-motion-planning-algorithms-in-autonomous-vehicle-navigation.
Khosroshahi et al., "Surround Vehicles Trajectory Analysis with Recurrent Neural Networks", 2016 IEEE 19th International Conference on Intelligent Transportation Systems (TSC), Nov. 1-4, 2016.
Kuderer et al., "Learning Driving Styles for Autonomous Vehicles for Demonstration", International Conference on Robotics and Automation, 2015.
Kuefler et al., "Imitating Driver Behavior with Generative Adversarial Networks", Jan. 1, 2017, https://archive.org/details/arxiv-1701.06699.
Langkvist et al., "A Review of Unsupervised Feature Learning and Deep Learning for Time-Series Modeling", Pattern Recognition Letters, vol. 42, Jun. 1, 2014, https://doi.org/10.1016/j.patrec.2014.01.008.
Lefevre et al., "A survey on motion predicting and risk assessment for intelligent vehicles" ROBOMECH Journal, Springer, 2014, 1 (1).
Leibig et al., "Leveraging uncertainty information from deep neural networks for disease detection", Scientific Reports, www.nature.com/scientificreports, Dec. 19, 2017.
Leung et al., "Distributional Prediction of Human Driving Behaviours using Mixture Density Networks", 2016, https://asl.stanford.edu/wp-content/papercite-data/pdf/Leung.Schmerling.Pavone.2016.pdf.
Li, "A Brief Summary on Neural Style Transfer", May 19, 2017, Xueting Li's Website.
Li et al., "InfoGAIL: Interpretable Imitation Learning from Visual Demonstrations", Advances in Neural Information Processing Systems 30 (NIPS 2017).

(56) References Cited

OTHER PUBLICATIONS

Liu et al., "Visualization of Driving Behavior Based on Hidden Feature Extraction by Using Deep Learning", IEEE Transactions on Intelligent Transportation Systems, Feb. 2017.

Marchi et al., "Deep Recurrent Neural Network-Based Autoencoders for Acoustic Novelty Detection", Hindawi, Computational Intelligence and Neuro9science, vol. 2017, ID 4694860.

Marin et al., "Bayesian Modelling and Inference on Mixtures of Distributions", Handbook of Statistics, vol. 25, Copyright 2005 Elsevier.

Fridman, MIT Self-Driving Cars: Sacha Arnoud, Director of Engineering, Waymo, https://www.youtube.com/watch?v=LSX3qdy0dFg&feature=youtu.be, May 29, 2018.

Morton, et al., "Simultaneous Policy Learning and Latent State Inference for Imitating Driver Behavior", Cornell University Library, arXiv.org > cs > arXiv:1704.05566, Apr. 19, 2017.

Ortiz, "Prediction of Driver Behaviour", Thesis, Mar. 2014.

Oshri et al., "There and Back Again: Autoencoders for Textual Reconstruction", https://cs224d.stanford.edu/reports/OshriBarak.pdf, Jun. 2015.

Park et al., "Sequence-to-Sequence Prediction of Vehicle Trajectory via LSTM Encoder-Decoder Architecture", https://arxiv.org/pdf/1802.06338.pdf, May 9, 2018.

Harris, "Researchers Prove Connected Cars Can Be Tracked", IEEE.org, https://spectrumieee.org/cars-that-think/transportation/advanced-cars/researchers-prove-connected-cars-can-be-tracked, Oct. 21, 2015.

Sadigh et al., "Planning for Autonomous Cars that Leverage Effects on Human Actions", Robotics: Science and Systems, Jun. 2016.

Sivaraman et al., "Learning Multi-Lane Trajectories using Vehicle-Based Vision", 2011 IEEE International Conference on Computer Vision Workshops.

Sivaraman et al., "Looking at Vehicles on the Road: A Survey of Vision-Based Vehicle Detection, Tracking, and Behavior Analysis", IEEE Transactions on Intelligent Transportation Systems, vol. 14, No. 4, Dec. 2013.

"Vector Representations of Words", TensorFlow, https://www.tensorflow.org/tutorials/word2vec, May 29, 2018.

\* cited by examiner

VEHICLE PATH PLANNING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
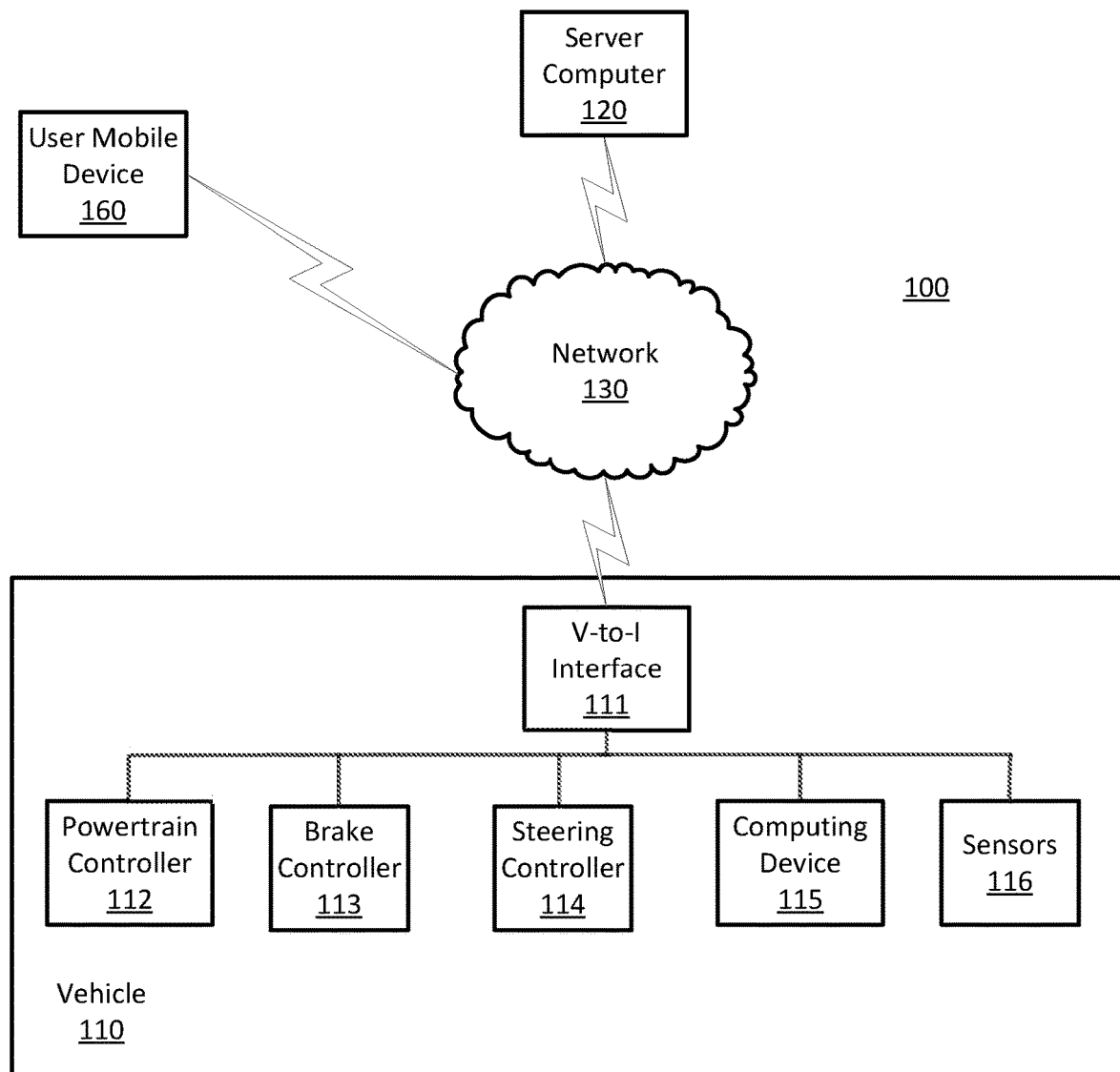
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted entirely or partly without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate a vehicle on a roadway in traffic including other vehicles. Based on sensor data, a computing device can determine a safe path for a vehicle to travel to reach a destination on a roadway in the presence of other vehicles and pedestrians, where a path is defined as a line connecting successive locations of a vehicle as it moves from a first location on a roadway to a second location on a roadway, and a safe path is defined as a path that keeps the vehicle within the roadway and does not include collisions with objects including other vehicles and pedestrians, for example.

A computing device in a first vehicle can be programmed to identify a second vehicle and a vehicle environment including a location with respect to the first vehicle. Based on the identity of the second vehicle, a style bank including a vehicle style vector can be selected and used to process vehicle sensor data including an image acquired by a vehicle video sensor with a deep neural network to predict one or more trajectories for the second vehicle based on the identity of a second vehicle and the vehicle environment, including the location of the second vehicle with respect to the first vehicle. The computing device can monitor the operation of the second vehicle while operating the first vehicle to determine observed trajectories for the second vehicle. The observed trajectories can be compared to the predicted trajectories and the result used to retrain the style bank portion of the deep neural network.

Disclosed herein is a method, including determining probabilities for predicted locations, speeds and directions of a first vehicle based on identifying the first vehicle and a driving environment and operating a second vehicle based on determined probabilities for predicted locations, speeds and directions of the first vehicle. The location, speed and direction for the first vehicle can be predicted based on vehicle sensor data. Processing vehicle sensor data can include segmenting color video data with a convolutional neural network to determine moving objects including vehicles. The second vehicle can be operated based on determining a planned path polynomial for the second vehicle. The planned path polynomial can be determined by a deep neural network based on the identity of the first vehicle and the driving environment.

The driving environment can be input to the deep neural network and output as a cognitive map that includes locations, speeds and directions for first vehicle. The identity of the first vehicle can be input to the deep neural network as data for hidden layers of the deep neural network. The first vehicle can be identified based on vehicle sensor data including video sensor data. The first vehicle can be identified based on vehicle-to-vehicle or vehicle-to-infrastructure communications. Determining probabilities for predicted locations, speeds and directions of a first vehicle can include determining a location of the first vehicle with respect to the second vehicle. A location for the first vehicle can be determined based on video, lidar or radar sensor data. Determining probabilities for predicted locations, speeds and directions of a first vehicle can be based on determining a path polynomial and its probability. The path polynomial and its probability can be included in a cognitive map.

Further disclosed is a computer readable medium, storing program instructions for executing some or all of the above method steps. Further disclosed is a computer programmed for executing some or all of the above method steps, including a computer apparatus, programmed to determine probabilities for predicted locations, speeds and directions of a first vehicle based on identifying the first vehicle and a driving environment and operating a second vehicle based on determined probabilities for predicted locations, speeds and directions of the first vehicle. The location, speed and direction for the first vehicle can be predicted based on vehicle sensor data. Processing vehicle sensor data can include segmenting video data with a convolutional neural network to determine moving objects including vehicles. The second vehicle can be operated based on determining a planned path polynomial for the second vehicle. The planned path polynomial can be determined by a deep neural network based on the identity of the first vehicle and the driving environment.

The computer apparatus can be further programmed to input the driving environment to the deep neural network and output a cognitive map that includes locations, speeds and directions for first vehicle. The identity of the first vehicle can be input to the deep neural network as data for hidden layers of the deep neural network. The first vehicle can be identified based on vehicle sensor data including video sensor data. The first vehicle can be based on vehicle-to-vehicle or vehicle-to-infrastructure communications. Determining probabilities for predicted locations, speeds and directions of a first vehicle can include determining a location of the first vehicle with respect to the second vehicle. A location for the first vehicle can be determined based on video, lidar or radar sensor data. Determining probabilities for predicted locations, speeds and directions of a first vehicle can be based on determining a path polynomial and its probability. The path polynomial and its probability can be included in a cognitive map.

FIG. 1 is a diagram of a traffic infrastructure system 100 that includes a vehicle 110 operable in autonomous (for avoidance of doubt, "autonomous" by itself in this disclosure means "autonomous" and not "semi-autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a communications bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
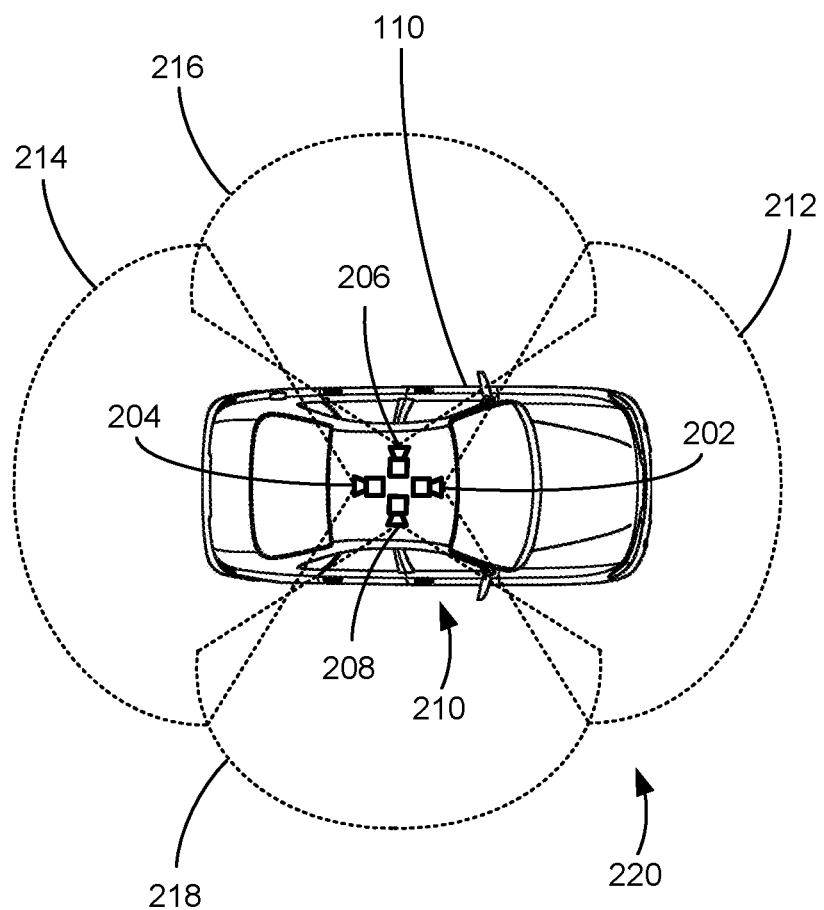
FIG. 2 is a diagram of an example vehicle including video sensors.

FIG. 2 is a diagram of an example vehicle 110 including video sensors 202, 204, 206, 208, referred to herein individually and collectively as video sensors 210. Each video sensor 202, 204, 206, 208 has a corresponding field of view 212, 214, 216, 218, respectively referred to herein individually and collectively as fields of view 220. Fields of view 220 indicate the volume in 3D space within which a video sensors 210 can acquire in-focus data, projected onto a 2D plane parallel with an assumed roadway surface. The location of objects around a vehicle 110 can be determined by combining information regarding the direction and size of the field of view 220 with respect to vehicle 110 and the assumption that the objects are on the same roadway surface as vehicle 110. Based on the 3D pose of the optical axis of a video sensor 210 (direction), the magnification of the lens (size), and the assumption that objects have the bottom portion of their 3D outline touching a common roadway surface with vehicle 110, the 3D direction and distance to the objects can be determined. 3D pose is the 3D location, for example x, y, and z spatial coordinates and roll, pitch and yaw rotational coordinates with respect to a coordinates system such as latitude, longitude and altitude.

Computing device 115 can input an image acquired by a video sensor 210 and environmental data including the identity and environmental data of a second vehicle included in the image, including which video sensor 210 acquired the image, and when the image was acquired, into a deep neural network. Computing device 115 can process image and environmental data using computing resources physically located in vehicle 110 or computing resources physically located at server computer 120, for example. The identity can include the identity of a human driver likely to be driving the second vehicle. The deep neural network is programmed based on the identity of the human driver by programming a style bank portion of a deep neural network with a style vector that describes the driving style of a human driver. A style bank and style vectors are described more fully in relation to FIG. 5, below. The style bank transforms image and environmental information from an encoding convolutional neural network into predictions of second vehicle motion to output to a decoding convolutional neural network to produce path polynomials with probabilities of occurrence, where a most likely path polynomial is accompanied by left and right less likely path polynomials as described in relation to FIG. 6.

Figure 3:
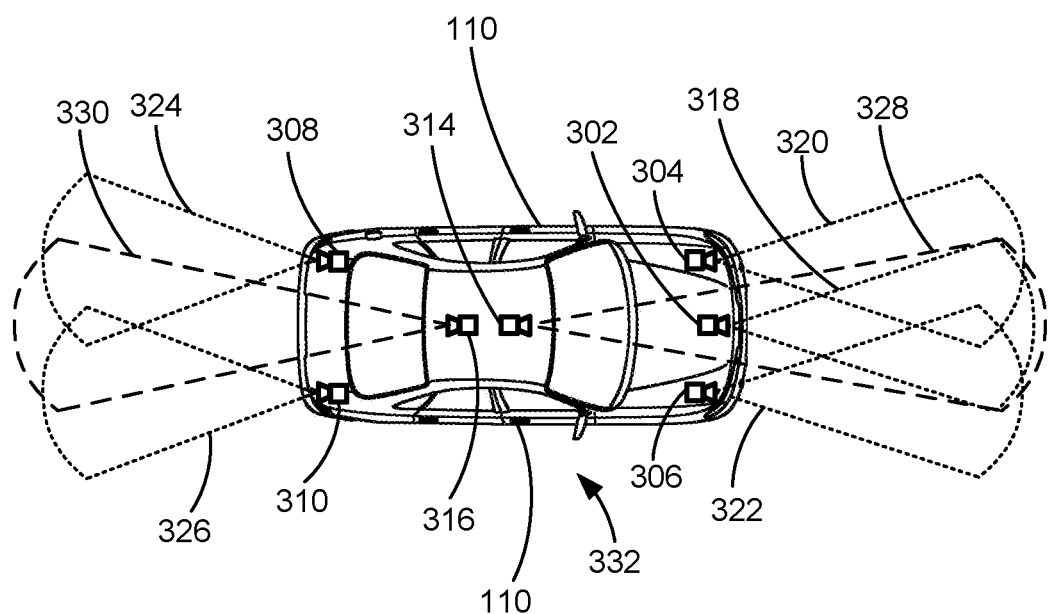
FIG. 3 is a diagram of an example vehicle including radar and lidar sensors.

FIG. 3 is a diagram of a vehicle 110 including radar sensors 302, 304, 306, 308, 310 (collectively, radar sensors 312) and lidar sensors 314, 316. Radar sensors 312 and lidar sensors 314, 316 each have a field of view 318, 320, 322, 324, 326, 328, 330, respectively, (individually and collectively 332) within which they can acquire usable data. Radar sensors 312 and lidar sensors 314, 316 acquire distance or range data regarding objects in an environment around a vehicle 110. By processing radar data or lidar data to determine the location of a second vehicle with respect to a vehicle 110, computing device 115 to monitor the operation of a second vehicle to determine location, speed and direction for the second vehicle, for example. The location, speed and direction data can be compared to predictions for second vehicle location, speed and direction made by a deep neural network (DNN) 400 described in relation to FIGS. 4 and 5. Computing device 115 can determine if the behavior of the second vehicle follows the prediction. In examples where the behavior of the second vehicle does not follow, the DNN 400 can be retrained based on the observed behavior.

Computing device 115 can determine distances and directions to objects in radar data and lidar data by combining the radar data and lidar data with map data based on determining a 3D pose of vehicle 110 in real-world x, y, and z spatial coordinates and roll, pitch and yaw rotational coordinates. The real-world 3D pose of vehicle 110 can be determined with data from GPS and accelerometer-based inertial navigation systems (INS) sensors 116, for example. Map data can be stored at computing device 115 memory or downloaded from server computer 120 via V-to-I interface 111, e.g. GOOGLE™ or OpenStreetMap (Open Street Map Foundation, Cambridge, United Kingdom) maps downloaded from the Internet. With map data, the 3D pose (location and direction) of vehicle 110 and information regarding fields of view 332, radar data or lidar data can be projected onto a cognitive map, which is a top-down view map of the environment around a vehicle 110. Cognitive maps are discussed in relation to FIG. 6, below. Radar and lidar data projected onto a cognitive map can be correlated with map data to determine roadways, lanes and distances and directions to and speeds of objects like other vehicles and pedestrians.

Figure 4:
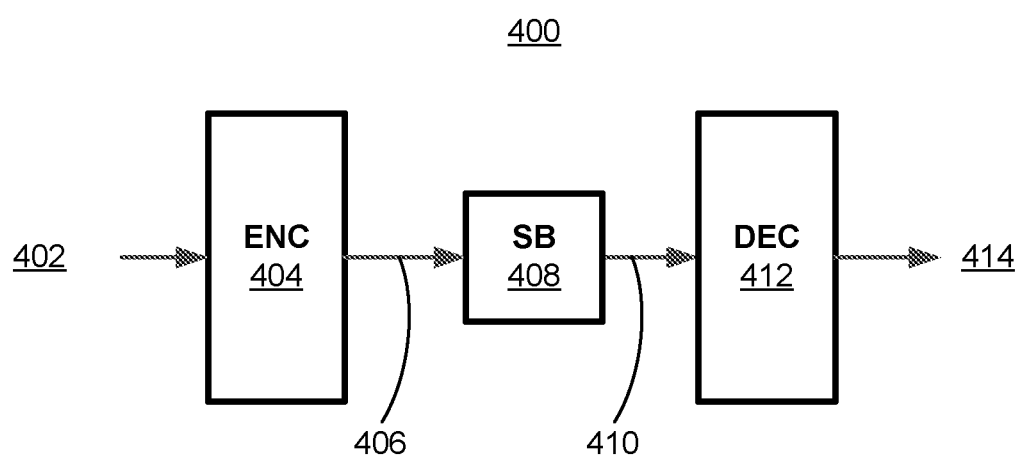
FIG. 4 is a diagram of an example deep neural network including a deep Bayesian neural network.

FIG. 4 is a diagram of a deep neural network (DNN) 400. DNN inputs image data 402 acquired by a video sensor 210. DNN 400 includes an encoding convolutional neural network (ENC) 404, a style bank (SB) 408, and a decoding convolutional network (DEC) 412. Encoded in the image data 402 is information regarding the environment, including information regarding the direction and size of the field of view 220 of the video sensor 210. The image data 402 is input to encoding convolutional neural network (ENC) 404, where a plurality of convolutional layers that apply spatial filters to input image data according to programming generated by training, are interspersed with a plurality of downsampling layers that reduce the spatial resolution of convolutional layers while retaining intermediate result information, likewise according to programming generated by training. Because input image 402 includes encoded environmental information including field of view 220 size and direction, ENC 404 can window and encode image data to generate vehicle cues, i.e., data describing the pose and location of the second vehicle with respect to vehicle 110. Vehicle cues describing the pose of the second vehicle and its location with respect to vehicle 110 are communicated to style bank 408 as vehicle cues 406, where the vehicle cues are included in arrays with reduced resolution in x and y while increasing bit depth to include a plurality of vehicle cues 406 that include a plurality of vehicle cues.

SB 408 inputs the vehicle cues 406 and processes them to generate motion cues 410 that describe predicted vehicle motion, including predicted path polynomials including corresponding probabilities, where the corresponding probabilities are an estimated probability that the second vehicle will travel that predicted path polynomial includes programming information included in a style vector, where the parameters that direct the computations of SB 408 layers of DNN 400 are gathered into a style vector with a number of bits determined by user input. The more bits, the more accurately a human driver's driving style can be represented. An example number of bits is about 500. When computing device 115 identifies the likely human driver of a second vehicle, the style belonging to that human driver can be accessed and downloaded into SB 408. A style vector can represent a human driver's driving style, or, in examples where a vehicle is operated by a computing device in full or partially autonomous mode, the driving style of a computing device operating as an automated driving assist system (ADAS). For DNN 400 a style vector can be one layer of individual weights and bias for one layer of computational nodes, whereas variational auto encoders can have two style vectors, namely mean and standard deviation vectors. Bayesian NNs can have computational node distributions in the style vector.

Style vectors are determined by training a DNN 400 to output path polynomials and probabilities by training ENC 404, SB 408, and DEC 412 jointly. A style vector is a vector of bits that include encoded programming data for SB 408. Once a DNN 400 is trained to output path polynomials and probabilities for a human driver's driving style, bits that define the programming for SB 408 can be gathered together in a vector and uploaded to computing device 115 memory, thereby capturing a human driver's driving style. Style vectors can include 300 to 500 bits, for example, and can include bit patterns that are not readily interpreted by humans. DNN 400 can be trained to output appropriate cognitive maps 414 including path polynomials and probabilities by feeding back results combined with ground truth according to a selected loss function that penalizes bad results and rewards results similar to ground truth. Ground truth is data corresponding to cognitive map 414, acquired from sources independent from DNN 400 image input, for example lidar sensor data or radar sensor data. Upon repeated trials with a plurality of images 402 and corresponding ground truth, DNN 400 can be trained to output correct cognitive maps 414 based in input images 402. Once trained, parameters from SB 408 called style vectors can be uploaded from SB 408 and stored at computing device 115 memory or uploaded to server computer 120 via V-to-I interface 111 and downloaded from computing device 115 memory or a server computer 120 into SB 408. Style vectors can be indexed and stored by individual human driver or groups of human drivers or ADAS drivers and located and downloaded into SB 408 upon request by computing device 115. Each human driver can have a unique style vector stored by computing device 115 in a matrix indexed by identity, for example.

In some examples, an individual human driver may not be identified by computing device 115. In these examples a style vector can be an average or other combination of one or more style vectors associated with one or more human drivers of the second vehicle. A simple approach is to assume a normal probability distribution per each element in the style matrix. Such an approach is known as a variational auto encoder where each element of the style vector consists of a mean and standard deviation element which can be sampled from. This can lead to a large variation in the style vector which would result in a less confident prediction in the path polynomial prediction. Another approach for a vehicle 110 with a low count of drivers, e.g. 2-4, is to treat the probability distribution as consisting of a Gaussian mixture or other distribution through use of a Bayesian neural network. The true probability distribution can be calculated via Bayesian inference using the collected data. The two approaches can be combined by assuming a simple probability distribution but use Bayesian analysis to detect the occurrence of a change point in the estimated distributions which would indicate a new driver or multiple drivers per vehicle. Lastly, the process of updating our posterior belief based on new data e.g. retraining DNN 400 based on observed behavior, would provide a flexible style vector that may account for natural improvements or changes to driving styles over time.

In another example information regarding the human driver of a vehicle is not available to computing device 115. In these examples computing device 115 can determine a second vehicle type and based on the second vehicle type determine a generic style vector that represents a likely driving style given that type of vehicle. For example, a large truck can have one group of likely driving styles while a sports car can have a different group of likely driving styles. Each type of identifiable vehicle can have a default style vector based on training the DNN 400 with a plurality of images and corresponding ground truth regarding driving styles corresponding Once a style vector is downloaded into SB 408, the SB 408 can process input image and environmental data or features derived from an input image and environmental data to form output motion cues 410 that describe probabilities of motions for second vehicle to encoding convolutional neural network 412. SB 408 is described in relation to FIG. 5, below.

Motion cues 410 are input to DEC 412, which upsamples motion cues, determines path polynomials and probabilities and projects them onto a cognitive map 414. DEC 412 is an upsampling cognitive neural network that inputs motion cues 410 output from SB 408. An upsampling cognitive neural network includes a plurality of convolutional layers that filter motion cue 414 data with convolution kernels determined by training. Convolutional layers are interspersed with a plurality of upsampling layers that use information from ENC 404 at the appropriate resolution to guide the upsampling via skip connections, for example. An output cognitive map 414 can include roadways and objects like other vehicles and pedestrians and is discussed in relation to FIG. 6. More than one computation of more than one vehicle with their own style vector may be chained (parallel and in sequence) to understand the interaction of vehicle drivers in the cognitive map at each incremental time step using each of the prior prediction location results.

Figure 5:
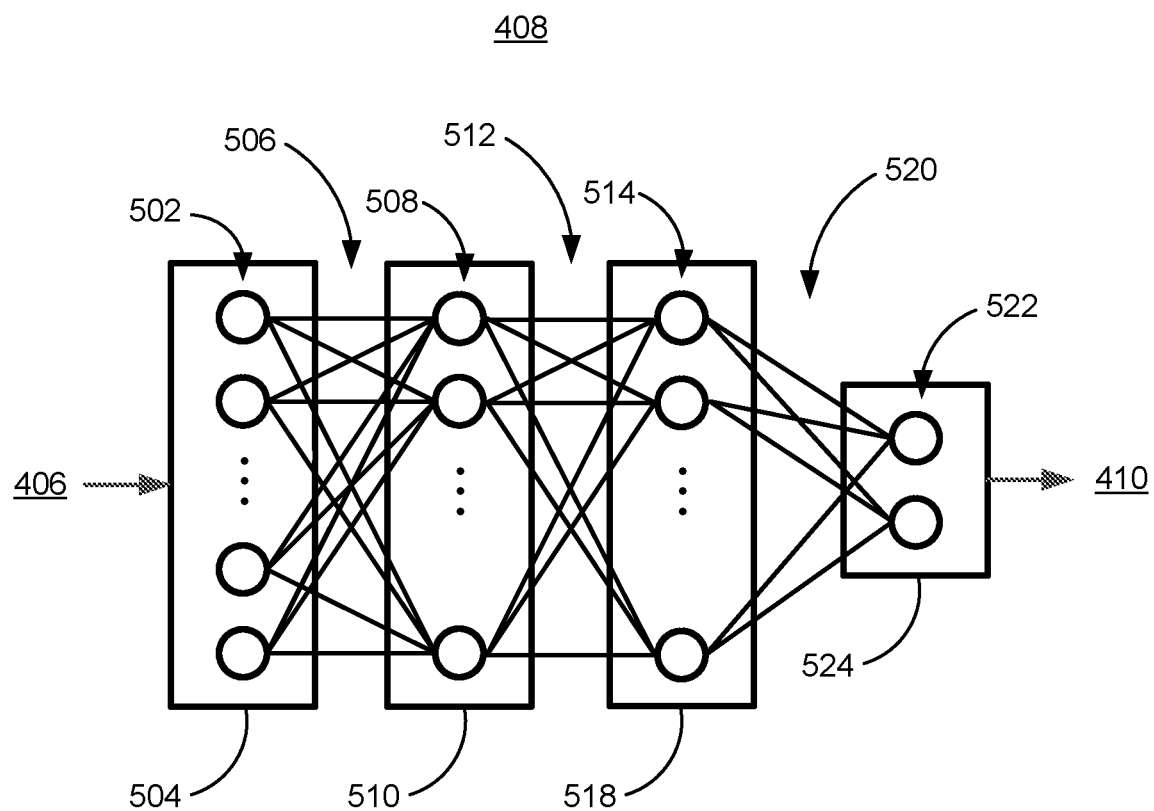
FIG. 5 is a diagram of an example deep Bayesian neural network.

FIG. 5 is a diagram of an example SB 408. SB 408 is a deep neural network that includes layers 504, 510, 518, 524 each having computational nodes 502, 508, 514, 522, respectively. Vehicle cues 406 are input to first layer 504 computational nodes 502, where the elements of vehicle cues 406 are each calculated upon and transferred to computational nodes 508 of next layer 510 by connections 506. The computational nodes 502 of first layer 504 are fully connected to computational nodes 508 of next layer 510 by connections 506, meaning that any output values from layer 504 can be input to any computational node 508 of next layer 510. In similar fashion, computational nodes 508 of layer 510 are fully connected to computational nodes 514 of layer 518 by connections 512 and computational nodes 514 of layer 518 are fully connected to computational nodes 522 of output layer 524 by connections 520. These connections 506, 512, 520 permit SB 408 to calculate a function of any combination of input and intermediate values. Once the SB 408 has been trained to output appropriate motion cues 410 based on the input vehicle cues 406 using ground truth as described above, the parameters that govern these calculations can be collected together to form a style vector. Bits included in a style vector correspond to parameters used by computational nodes 502, 508, 514, 522 of SB 408 to process input vehicle cues 406 and can be floating point numbers, for example.

SB 408 processes input vehicle cues 406 by determining Bayesian probabilities associated with intermediate results determined based on input vehicle cues 406. Bayesian neural network SB 408 would provide us with probabilistic understanding of the computational nodes of the layers, for example understand the confidence in the weights of the network, and the final output. cues. Computational nodes 502 of input layer 504 transform input vehicle cues 406 to probability distributions that describe probabilities of vehicle cues 406 occurring, for example. Computational nodes 508, 514, 522 of subsequent layers 510, 518, 524 calculate Bayesian probabilities based on inputting probability distributions. Bayesian probabilities are probabilities P determined according to an equation $P=(a|b)$ where the probability P is equal to the probability of event a occurring is based on a probability distribution corresponding to a conditioned on a probability distribution corresponding to the probability of b occurring. This assumes that the probability distribution corresponding to the probability of b occurring is determined before the determination of the probability of a occurring. In this fashion, information regarding a previous state corresponding to vehicle cues 406 and therefore information regarding previous driving behavior can be incorporated in computational nodes 502, 508, 514, 522 calculations using probability distributions communicated via connections 506, 512, 520. Parameters that determine which input probability distributions and which Bayesian probabilities to output as transformed probability distributions are saved as bits in a style vector. Training a DNN 400 as described above results in a selection of parameters saved as bits in a style vector. The trained style vector can be uploaded from DNN 400 by computing device 115 and stored in memory, indexed by an identity corresponding to the identity of a human driver determined by computing device 115.

SB 406 incorporates a Bayesian framework where the driving style vector representation corresponds to a probability distribution. Similarly, the neural network parameters can include probability distribution weights and biases on each neuron. There are three useful outcomes of this addition. The first advantage is that the driving style vector may incorporate natural variation seen in the driving style of a human as well as accounting for variation when a vehicle is shared amongst multiple drivers. Secondarily, the result is a prediction of the probability space of the future vehicle trajectory. It is thus possible to account for the most likely path and better predict low probability trajectory extremes. Thirdly, the driving style vector representation may assume uninformative prior assumptions or very large variation in the vector's probability distributions. As a result, it is possible to learn common driving style behaviors such as whether a driver will tend to use a turn signal with a high precision (a probability distribution of that particular style component can be viewed as equivalent to person's real driving style). On the other hand, driving style behaviors not yet monitored for a given driver (e.g., could include driving in icy conditions or in fog, etc.) would have a very large uncertainty. This would result in a measurable prediction confidence that can be used to inform the motion planning for both observed driving environments and driving environments where a particular driver's driving style is as yet unobserved. Techniques discussed herein improve operation of vehicle 110 by providing a better and more accurate method to predict future human driver path polynomials.

Figure 6:
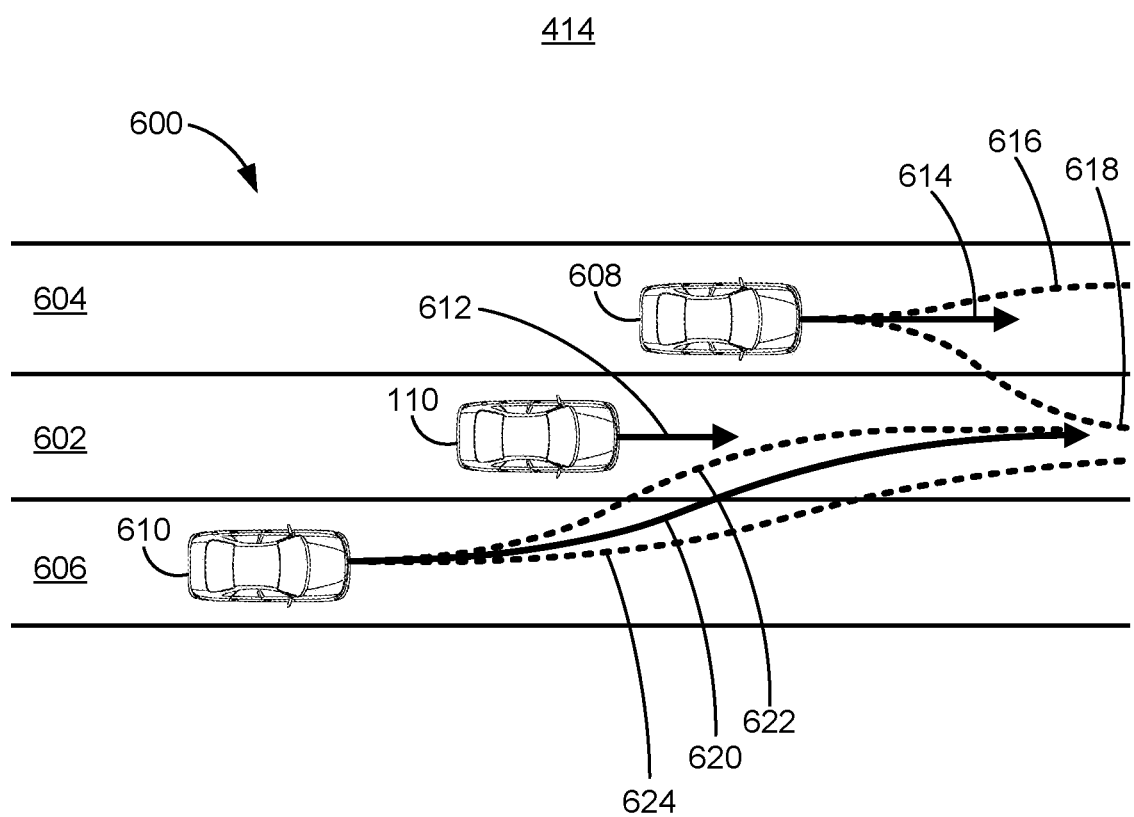
FIG. 6 is a diagram of an example traffic scene.

FIG. 6 is a diagram of an example cognitive map 414. A cognitive map is a top-down representation of an environment around a vehicle 110. The cognitive map 414 can be created by computing device 115 by acquiring and processing one or more of video data, radar data, lidar data, or V-to-V or V-to-I networking data with vehicle 110 pose data and map data to determine locations for objects in an environment around a vehicle 110 including a roadway 600, lanes 602, 604, 606 and vehicle 110, and second and third vehicles 608, 610. A coordinate system of cognitive map 414 can be centered at vehicle 110 and move with vehicle 110 as it operates on roadway 600 in lane 602. Included in cognitive map 414 is a path polynomial 612 for vehicle 110. Path polynomial 612 is an illustration of a path specified by a polynomial function of vehicle 110 3D pose vectors that describe predicted locations for vehicle 110. Computing device 115 can determine commands to send to controllers 112, 113, 114 to control vehicle 110 powertrain, steering and braking to operate vehicle 110 to reach predicted locations of the path polynomial 612 at predicted times and thereby operate vehicle 110 to reach a goal state, for example reaching a destination location on a roadway 600 with a predicted speed and heading.

Computing device 115 can create a cognitive map 414 starting with determining a vehicle 110 location including 3D pose for vehicle 110 as discussed above in relation to FIG. 3. Computing device can use the 3D pose to locate map data representing a region around the vehicle 110 and create a cognitive map 414, centered on vehicle 110 and oriented in a direction based on path polynomial 612 of vehicle 110 including an icon representing vehicle 110 at the center. Computing device 115 can include roadway 600 and lanes 602, 604, 606 based on map data improved by processing one or more of video data, radar data, or lidar data to determine the locations of roadway 600 and lanes 602, 604, 606. Video data, radar data, or lidar data can be processed using machine vision techniques including deep neural networks to process input sensor data and output determined features with distances and directions from vehicle 110.

Cognitive map 414 can be used by computing device 115 to operate vehicle 110. Computing device 115 can determine a path polynomial 612, where path polynomial is a polynomial function that includes predicted pose vectors for vehicle 110. Computing device 115 can create commands to send to controllers 112, 113, 114 to control vehicle 110 powertrain, steering and braking to cause vehicle 110 to achieve the predicted pose vectors that define vehicle location, direction and speed and thereby operate vehicle 110 along the path polynomial 612. Computing device 115 can determine the presence of second and third vehicles 608, 610 in lanes 604, 606, respectively adjacent to vehicle 110 lane 602. Computing device 115 can predict path polynomials 614, 620 for second and third vehicles 608, 610, respectively, based on empirical data regarding previous behavior of vehicles in traffic and user input regarding the number and types of different driving behaviors identified and recorded by observers. In real world driving, the range of possible path polynomials 616, 618, 622, 624 for a given vehicle based on the above criteria is so great that if path polynomials 614, 620 are added to cognitive map 414 for each possible path polynomial 616, 618, 622, 624 cognitive map 414 can become filled with path polynomials 614, 616, 618, 620 622, 624 for other vehicles and therefore prevent computing device 115 from being able to determine a path polynomial 612 for vehicle 110 that does not interfere with another vehicle's path polynomial 614, 620. By interfering with another vehicle's path polynomial 614, 616, 618, 620 622, 624 we mean that computing device 115 can predict that operating vehicle 110 on path polynomial 612, will, with high probability (>90%), cause a collision or near-collision between vehicle 110 and second vehicle 608 or third vehicle 608, operating on for example.

Techniques discussed herein improve a cognitive map 414 by predicting path polynomials 614, 620 based on selecting a style vector based on identifying a driver or type of driver for second or third vehicles 608, 610 in the environment around a vehicle 110, and thereby programming SB 408 to produce motion cues 410 that permit DNN 400 to output a cognitive map 414. The cognitive map 414 includes information regarding high probability second or third vehicle 608, 610 path polynomials 614, 620 and low probability path polynomials 616, 618, 622, 624. "High probability" in this context means that computing device 115 has determined a greater than 90% probability that a second or third vehicle 608, 610 will operate on the path polynomial 614, 620. A "low probability" in this context means that computing device 115 has determined a greater than 50% probability that a second or third vehicle 608, 610 will operate on one of the path polynomials 616, 618, 622, 624 or a path polynomial between path polynomials 616, 618, 622, 624 and path polynomials 614, 620, respectively, with a probability between low and high.

Cognitive map 414 can be created by DEC 412 layers of DNN 400 by training DEC 412 using ground truth cognitive maps 414 at varying resolutions to use as prototypes to guide upsampling layers of DEC 412. Upsampling layers of DEC 412 combine prototype cognitive maps 414 with motion cues 410 output by SB 408 to populate a cognitive map 414 with information regarding a second or third vehicle 608, 610 path polynomials 614, 616, 618, 620, 622, 624. DNN 400 can process input image and environmental data 402 by sampling video sensors 210 each in turn periodically and processing the input image and environmental data 402 to sample the environment around vehicle 110. The environment around vehicle 110 can be sampled periodically in this fashion to provide cognitive maps 414 with a complete view of the environment around vehicle 110 covered by fields of view 220 of video sensors 210. In examples of techniques described herein, the image and environmental data can be pre-processed by additional neural networks to extract features for processing by DNN 400. For example, a neural network can perform object detection and localize vehicles onto a cognitive map. Processing the image data and other sensor data may provide further data such as weather data, ambient lighting data, brake light activation data, etc. which can be included in the cognitive map. In examples of techniques discussed herein, this cognitive map can be used as input to DNN 400.

In an example where a plurality of vehicles are driving in proximity to vehicle 110, DNN 400 can be used to estimate the most probable driving behaviors of the human or ADAS drivers of the plurality of vehicles and a path polynomial for operating vehicle 110 per some increment of time into the future. This would then be updated by the interactions of vehicle 110 with the plurality of vehicles to predict the next time step of the trajectories of the plurality of vehicles up to the desired future time duration (e.g. 0.5 seconds time steps and up to 10 seconds into the future). This would provide information of the most probable path polynomial of the plurality of vehicles and allow computing device 115 to perform motion planning, while providing for avoidance of future vehicle trajectories which may influence physical space that may be inaccessible in the future.

Figure 7:
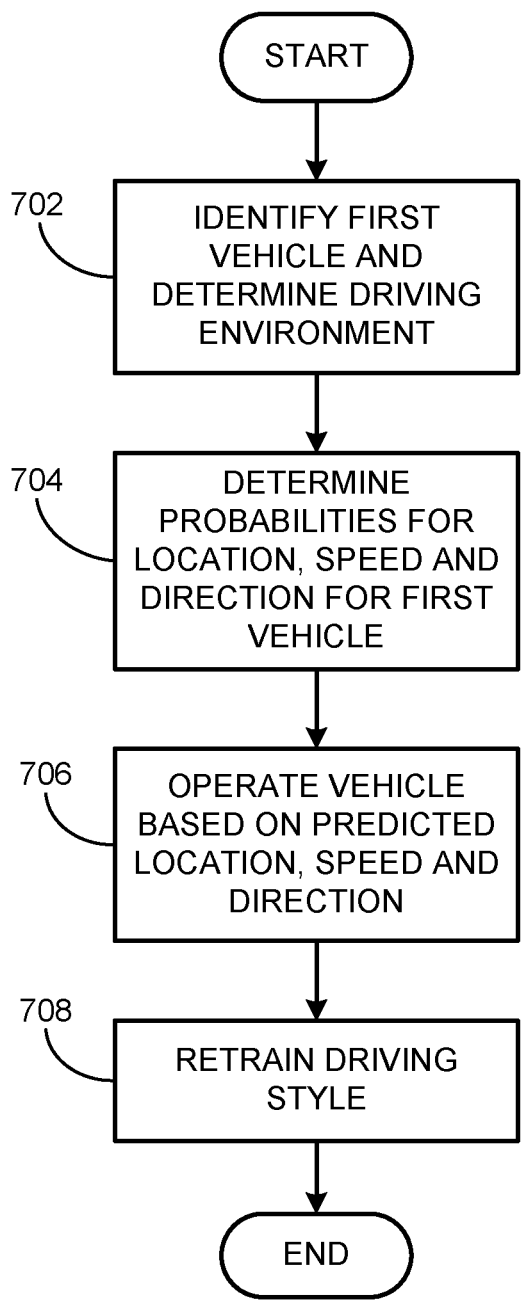
FIG. 7 is a flowchart diagram of an example process to operate a vehicle.

FIG. 7 is a diagram of a flowchart, described in relation to FIGS. 1-6, of a process 700 for operating a vehicle based on identifying a first vehicle and driving environment, determining probabilities for second vehicle motion and operating a second vehicle based on the determined probabilities. Process 700 can be implemented by a processor of computing device 115, taking as input information from sensors 116, and executing commands and sending control signals via controllers 112, 113, 114, for example. Process 700 includes multiple blocks taken in the disclosed order. Process 700 also includes implementations including fewer blocks or can include the blocks taken in different orders.

Process 700 begins at block 702, in which a computing device 115 included in a vehicle 110 can identify a first vehicle and determine a driving environment. Block 702 begins by detecting a first vehicle and tracking its position over time using data from video sensors, lidar sensors, and radar sensors, for example. Additionally, data regarding a first vehicle can be obtained by computing device 115 from a first vehicle via V-to-V networking or from a traffic infrastructure server computer 120 via V-to-I networking. Data from video sensor, lidar sensor, radar sensor and networking can be combined using sensor fusion techniques, which compensate for differing sensors fields of view and resolutions to build a single map including video data, lidar data, radar data, and V-to-V data. Combining multiple sources of sensor data by sensor fusion can avoid errors where networking positioning accuracy may be poor based on interference or other error source, for example. Data from networking sources for vehicles detected by networking but not within sensor range can be filtered to using a moving window filter like a Kalman filter, which can reduce erratic or noisy positioning signal due to poor network positioning.

The primary method of long term vehicle tracking uses networking to track vehicles. If networking is unavailable or a vehicle is not-equipped with a network interface, machine vision techniques can be used to identify license plates in video sensor data. In another example, a vehicle 110 can request video sensor data from other vehicles about target vehicles within their video sensor range and field of view via V-to-V networking to capture license plate data to determine an identity, based on the license plate, of a target vehicle to a current network interface identifier, for example a MAC address of a network interface of the target vehicle.

Driving environment data is determined by inputting image data from a video sensor 210, including identifying which video sensor 210 acquired the image. Computing device 115 can determine a field of view 220 based on which video sensor 210 acquired the image. Determining driving environment data can include encoding a 3D pose of a vehicle in the image. The information can be encoded as text, symbols or binary codes to be interpreted by ENC 402 and included in vehicle cues 406. Driving environment data can be acquired from other vehicles equipped with sensors 116, such as video sensors 210, which can be used to image a view that a human driver sees, process it to compress the data which can then be sent via V-to-V networking to computing device 115 in vehicle 110. Driving environment data can include a combination of the vehicle's 110 own sensors 116, V-to-V networking information provided by the local driving environment around that particular vehicle, V-to-V requests to human driven vehicles for sensor data and using V-to-V networking to request data from other vehicles about human driven vehicles. Other input features may be used which may correlate with driving behavior such as weather, time of day, day of week, day of year, etc. Furthermore, interior sensor data may be transmitted from human driven vehicles to vehicle 110. For example, head pose and eye tracking from interior vehicle cameras can correlate well in predicting future driver behavior. Driving environment data may be transmitted to vehicle 110 based on V-to-V requests and encoded into an image as text, symbols or binary values.

At block 704 process 700 determines probabilities for location, speed and direction for a first vehicle. A style vector corresponding to the identity of a human driver identified at block 702 is recalled from memory by computing device 115 and downloaded into SB 408. An image including encoded driving environment data is input to DNN 400 to produce a cognitive map 414 that includes a first vehicle 608 and high and low probability path polynomials 614, 616, 618 as discussed above in relation to FIGS. 4 and 5, that predict location, speed, directions, and probabilities for first vehicle motion.

At block 706 process 700 operates a vehicle based on predicted location, speed, directions, and probabilities for first vehicle motion. Computing device 115 can combine the cognitive map 414 output from DNN 400 with cognitive map data based on vehicle 110 sensors 116 and map data. DNN 400 can produce a cognitive map 414 for each vehicle 608, 610 in the environment around a vehicle 110. The cognitive maps 414 can be combined with cognitive map data based on vehicle 110 sensors 116 and map data to improve the cognitive map data by including predicted locations, speeds, directions and probabilities for vehicles determined based on identifying human driving styles. Human driving styles are identified by training DNN 400 with image and ground truth data corresponding to an identified human driver and storing a style vector from a trained SB 408, indexed by human driver identity for later recall by computing device 115.

Computing device 115 operates vehicle 110 based on cognitive map data by determining a path polynomial 612 that permits vehicle 110 to reach a destination location on a roadway 600 while maintaining a target speed and avoiding collisions or near-collisions by avoiding high probability path polynomials 614, 620. Computing device 115 can determine a path polynomial 612 that can interfere with a low probability path polynomial 616, 618, 622, 624, as long as computing device 115 has planned an escape path polynomial that can be implemented if first or second vehicle 608, 610 is detected moving into lane 602. In this example an escape path polynomial can be path polynomial 612 including slowing down. In the example of a lane change maneuver, an escape path polynomial can include inverting a remaining portion of the maneuver.

At block 708 process 700 retrains DNN 440 based on observed driving styles. While computing device 115 is operating vehicle 110 at block 706, computing device 115 can also be monitoring the behavior of a first and second vehicle 608, 610. Using techniques for locating and tracking vehicles with vehicle 110 sensor 116 data as discussed above in relation to FIG. 7, computing device 115 can determine path polynomials traveled by first and second vehicles 608, 610. DNN 400 can be retrained based on inputting the original image along with a loss term calculated by differencing a high probability predicted path polynomial 614, 620 from an observed path polynomial. In this fashion SB 408 programming and hence a style vector can be updated to reflect observed driving styles.

A path polynomial includes components of vehicle 110 acceleration/de-acceleration and driving angle which can be separated out from the path polynomial and treated individually to improve the loss function. A non-linear loss function can be used to overly penalize large errors and avoid over training due to small errors in the path polynomial. This data must be collected over a duration of time to obtain an accurate estimate of human driving style.

It is expected that a server computer 120 will be used to store long term driving style data per each vehicle or human driver. Through the use of the Bayesian neural network and treatment of the driving style vector as a collection of probability distributions we can continuously optimize the estimated driving style to understand the mean and variation of each element in the vector over time and over many observations of a given human driven vehicle which generally corresponds to a single driver. Computing device 115 can upload either only the style vector data collected or the complete data set for both input and output. Following block 708 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Python, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining a plurality of possible first vehicle path polynomials including predicted locations, speeds and directions of a first vehicle, and further determining respective probabilities of each of the path polynomials, based on (a) identifying the first vehicle according to at least one of a type of the first vehicle or a human driver of the first vehicle and (b) a driving environment in a second vehicle;
   determining a second vehicle planned path polynomial for the second vehicle based on the determined probabilities corresponding to the predicted first vehicle path polynomials; and
   operating the second vehicle based on the second vehicle planned path polynomial.

2. The method of claim 1, further comprising predicting the location, speed and direction for the first vehicle based on vehicle sensor data.

3. The method of claim 2, wherein processing vehicle sensor data includes segmenting video data with a convolutional neural network to determine moving objects including vehicles.

4. The method of claim 1, wherein the plurality of possible first vehicle path polynomials includes three or more path polynomials.

5. The method of claim 1, wherein the planned path polynomial is determined by a deep neural network based on the identity of the first vehicle and the driving environment.

6. The method of claim 5, wherein the driving environment is input to the deep neural network and output as a cognitive map that includes locations, speeds and directions for first vehicle.

7. The method of claim 5, wherein the identity of the first vehicle is input to the deep neural network as data for hidden layers of the deep neural network.

8. The method of claim 1, further comprising identifying the first vehicle based on vehicle sensor data including video sensor data.

9. The method of claim 1, further comprising identifying the first vehicle based on vehicle-to-vehicle or vehicle-to-infrastructure communications.

10. A system, comprising a processor; and
    a memory, the memory including instructions to be executed by the processor to:
       determine a plurality of possible first vehicle path polynomials including predicted locations, speeds and directions of a first vehicle, and further determining respective probabilities of each of the path polynomials, based on (a) identifying the first vehicle according to at least one of a type of the first vehicle or a human driver of the first vehicle and (b) a driving environment in a second vehicle;
       determine a second vehicle planned path polynomial for the second vehicle based on the determined probabilities corresponding to the predicted first vehicle path polynomial; and
       operate the second vehicle based on the second vehicle a planned path polynomial.

11. The system of claim 10, further comprising predicting the location, speed and direction for the first vehicle based on vehicle sensor data.

12. The system of claim 11, wherein processing vehicle sensor data includes segmenting video data with a convolutional neural network to determine moving objects including vehicles.

13. The method of claim 1, wherein the second vehicle planned path polynomial is based on the determined probabilities corresponding to the predicted first vehicle path polynomials being above a predetermined threshold.

14. The system of claim 10, wherein the planned path polynomial is determined by a deep neural network based on the identity of the first vehicle and the driving environment.

15. The system of claim 14, wherein the driving environment is input to the deep neural network and output as a cognitive map that includes locations, speeds and directions for the first vehicle.

16. The system of claim 14, wherein the identity of the first vehicle is input to the deep neural network as programming data for hidden layers of the deep neural network.

17. The system of claim 10, further comprising identifying the first vehicle based on vehicle sensor data including video sensor data.

18. The system of claim 10, further comprising identifying the first vehicle based on vehicle-to-vehicle or vehicle-to-infrastructure communications.

19. A system, comprising:
- means for controlling second vehicle steering, braking and powertrain;
- computer means for:
  - determining a plurality of possible first vehicle path polynomials including predicted locations, speeds and directions of a first vehicle, and further determining respective probabilities of each of the path polynomials, based on (a) identifying the first vehicle according to at least one of a type of the first vehicle or a human driver of the first vehicle, and (b) a driving environment in a second vehicle;
  - determining a second vehicle planned path polynomial for the second vehicle based on the determined probabilities corresponding to the predicted first vehicle path polynomial and the means for controlling second vehicle steering, braking and powertrain; and
  - operating the second vehicle based on the second vehicle planned path polynomial for the second vehicle.

20. The system of claim 19, further comprising predicting the location, speed and direction for the first vehicle based on vehicle sensor data.

* * * * *